United States Patent Office 2,945,396
Patented July 19, 1960

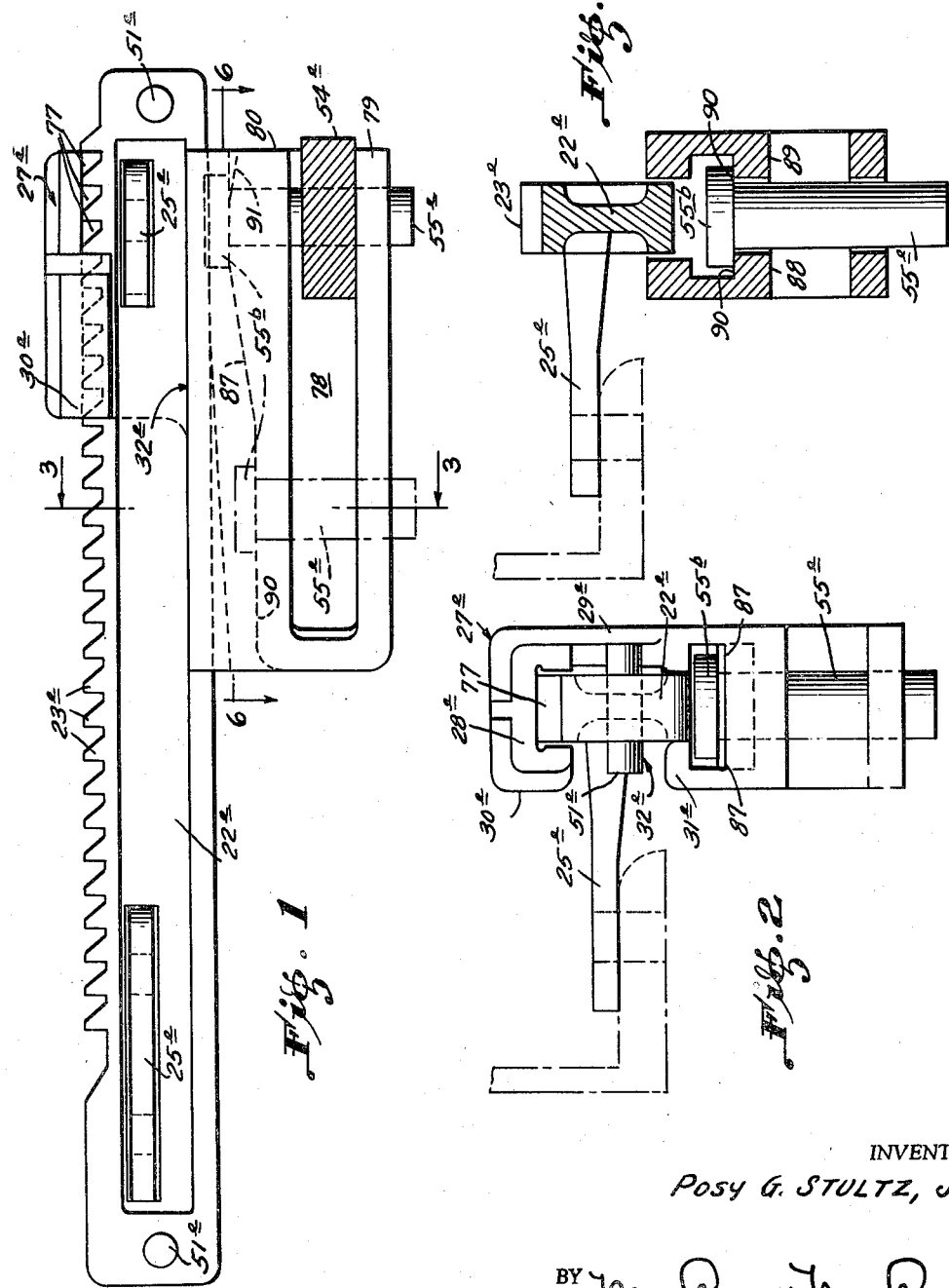

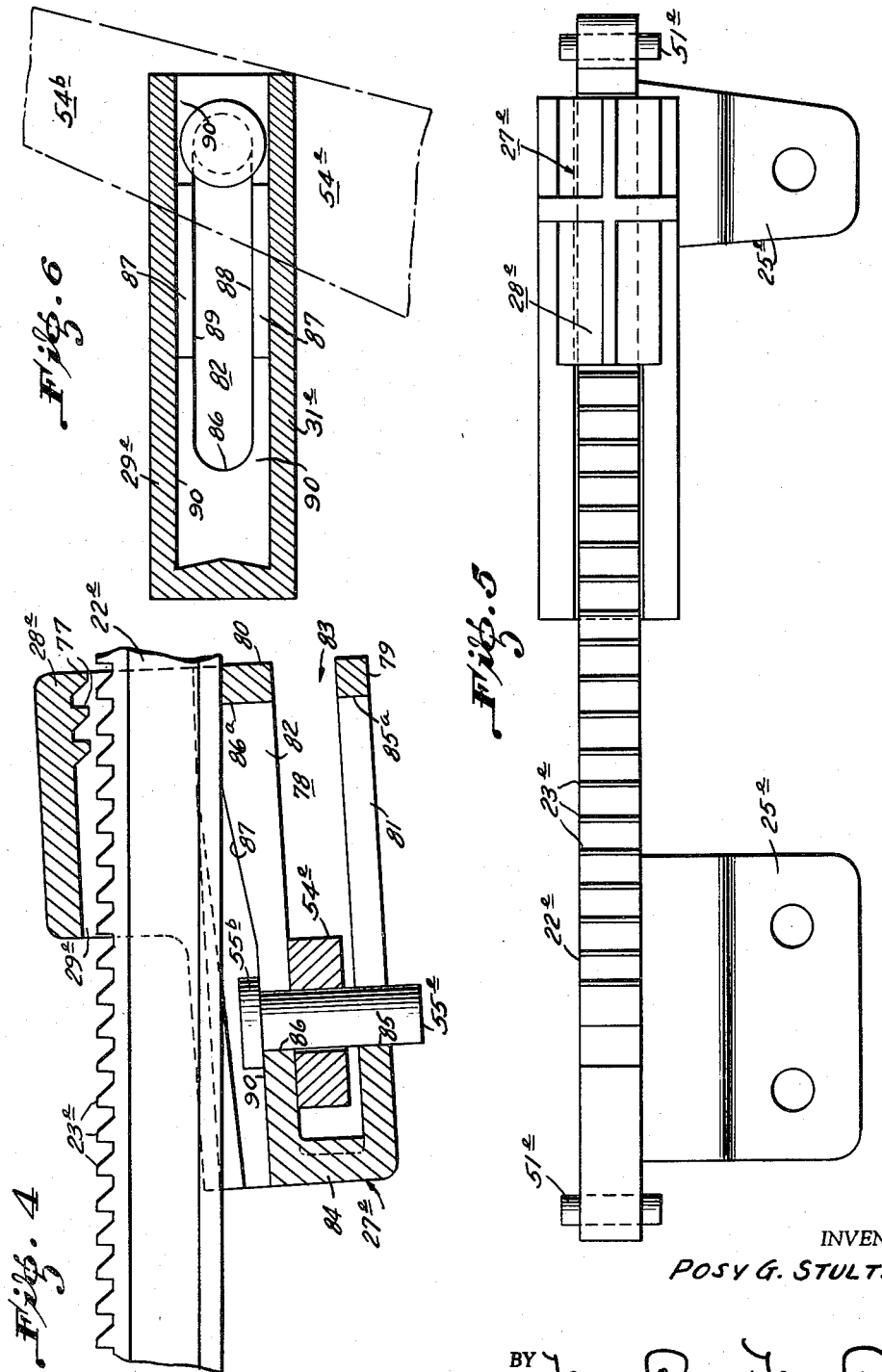

2,945,396

SLACK ADJUSTER FOR THE FOUNDATION BRAKES OF RAILWAY FREIGHT CARS

Posy G. Stultz, Jr., Roanoke, Va., assignor to Charles M. O'Boyle, Wilmington, Del.

Original application Dec. 5, 1955, Ser. No. 550,939. Divided and this application Jan. 28, 1957, Ser. No. 639,601

3 Claims. (Cl. 74—533)

The present invention relates to slack adjusters for the foundation brakes of railway freight cars and has for its general object and purposes certain improvements over the prior Patent No. 2,675,894 granted April 20, 1954, to Charles M. O'Boyle.

The present application is a division of my prior application Serial No. 550,939, filed December 5, 1955, now abandoned.

While the present invention has the same objects as those stated in the prior patent aforesaid, it has certain additional objects which involve more particularly the overall shortening of the slack adjuster together with corresponding decrease in the cost of original production.

Another object of the present invention is to provide an improved slack adjuster in which the mode of operation is changed and simplified over that disclosed in said prior patent more particularly in that the rack bar is made stationary with the freight car or its truck while the housing carrying the pawl is made movable along the rack bar and is connected to the brake rigging whereby an adjustment of the housing relatively to the rack bar will accomplish a slack take-up operation in the brake rigging and correspondingly reduce piston travel in the brake cylinder whereby the linear limits of such piston travel may be kept within the maximum permitted by regulatory bodies which control the operations of braking systems.

A further object of the invention is to provide an inexpensive, simply-constructed slack adjuster of a minimum number of parts in which the housing is adapted for easy movement along the rack bar providing thrust take-up in the brake rigging in a direction more nearly in alignment with the member of the brake rigging to which the moveable housing is coupled.

With the foregoing and other objects in view, the invention will be more fully described hereinafter, and will be more particularly pointed out in the claims appended hereto.

In the drawings, wherein like symbols refer to like or corresponding parts throughout the several views:

Figure 1 is a side elevational view, with the floating lever shown in section, of the slack adjuster with the teeth of the housing held in interlocked position with the teeth of the rack bar.

Figure 2 is an end elevational view taken from the right hand end of Figure 1.

Figure 3 is a vertical transverse sectional view taken on the line 3—3 of Figure 1.

Figure 4 is a longitudinal sectional view taken through a portion of the device shown in Figure 1 and illustrating the floating lever and its pin connection in a subsequent position in which the teeth are freed and the housing tilted to permit disengagement of its teeth from the teeth of the rack bar.

Figure 5 is a top plan view of the form of invention shown in Figure 1; and

Figure 6 is a horizontal longitudinal sectional view taken on the line 6—6 of Figure 1.

Referring more particularly to Figures 1 to 6 inclusive, the rack bar $22^e$ is fixed by its lateral webs or brackets $25^e$ to the center sill or other fixed part of the under-frame of the car, such rack bar $22^e$ having teeth $23^e$ that upstand from the upper edge of the rack bar.

These teeth have inclined inner faces, which faces are disposed toward the center of the car and vertical or abrupt outer faces which are toward the end of the car.

The movable housing $27^e$ is slidably supported on the rack bar and may comprise a top wall $28^e$, an outer side wall $29^e$ and inner upper and lower side wall sections $30^e$ and $31^e$ respectively which are spaced apart by the slot $32^e$ to accommodate the webs or brackets $25^e$ in the sliding movement of the housing $27^e$ on the stationary rack bar $22^e$.

One or more pawl teeth 77 project down from the inner side of the top wall $28^e$ of the housing, such teeth 77 being complementary to the rack bar teeth $23^e$ so as to mate and interfit therewith in the manner shown in Figure 1.

The floating lever $54^e$, having the handle $54^b$ is received in a lever slot 78 in the base portion of the housing $27^e$. This lever slot 78 divides the base into a lower base member 79 and an upper base member 80. In these base members 79 and 80 are provided pin slots 81 and 82 which provide for lost-motion. The inner end of the lever slot 78 is open as shown at 83 to permit the housing to be fitted to the floating lever $54^e$. The outer end of the lever slot 78 is closed at 84 and is provided with shoulders 85 and 86 which define outer ends of the pin slots 81 and 82.

A pin $55^e$ pivotally couples the floating lever $54^e$ to the movable housing $27^e$, which pin has a diametrically enlarged head $55^b$ that is wider than the upper pin slot 82, which condition is shown to best advantage in Figure 6. This will prevent the pin $55^e$ from dropping down through the slot 82 and it is also for the purpose of having the outstanding under surface of the pin head $55^b$ ride upon inclined surfaces 87 on the upper edges of lateral walls 88 and 89 which between them define the upper pin slot 82. These walls 88 and 89 are also provided with flat surfaces 90 at the lower outer ends of the inclined surfaces 87 and with rounded or oppositely inclined surface 91 at the inner or higher ends of the inclined surfaces 87.

In the operation of the invention, Figure 1 shows substantially an initial or origin position of the movable housing $27^e$ to substantially the extreme right hand end of the stationary rack bar $22^e$. The floating lever $54^e$ is at the right hand end of the lever slot 78 with the pin $55^e$ in contact with the end walls $85^a$ and $86^a$ of the slots 81 and 82. In this position the head $55^b$ of the pin $55^e$ rests at the upper ends of the inclined surfaces 87 and the pin $55^e$ is in its most elevated position, it being understood that this pin $55^e$ slides freely up and down in an opening through the floating lever $54^e$ and of course freely up and down through the pin slots 81 and 82. Figure 1 therefore shows the origin position of the device with new brake shoes. When wear occurs in the shoes developing undue slack in the brake rigging, such excess slack may from time to time be taken up by manually grasping the handle $54^b$ and pulling the floating lever $54^e$ through the lost-motion to the position shown in Figure 4 and then continuing the pull to the left until the brake shoes are brought against the wheels. Incidental to this left hand movement of the floating lever $54^e$, the pin head $55^b$ and the pin $55^e$ will be permitted to descend by gravity down the inclined surfaces 87 and onto the flat surface 90, as shown in Figure 4. In fact the lever $54^e$ will not entrain the housing 27e to move therewith until the pin 55e engages the end walls 85 and 86 of slots 81 and 82. It will be understood that in the full line position of Figure 1 the upper surface of the head 55b of the pin 55e will either directly engage the lower surface of the fixed rack bar 22e or such surfaces will be closer together than the height of the teeth 77 and 23e. In other words, in the full line position of Figure 1 the pin head 55b will act as a lock preventing disengagement of the rack bar and housing teeth during a brake application. It will also prevent disengagement of these teeth on hopper cars when they are turned upside down for dumping. However, after the lever 54e has completed its lost-motion movement the pin head 55b will be in the dotted position of Figure 1 and therefore when the lever 54e entrains the housing 27e to move to the left therewith, the inclined surfaces of the housing teeth 77 will ride up on the inclined surfaces of the fixed rack bar teeth 23e and thus the excess slack taken up in the brake rigging by the movement of the lever 54e to the left will be eliminated from the brake rigging as the housing teeth 27 will take a new position with respect to the rack bar teeth 23e.

In this way excess slack in the brake rigging which develops from time to time may be eliminated therefrom by short movements of the housing 27e relative to the fixed rack bar 22e in the left hand direction as looked at in Figure 1. These movements may be in increments of one or more teeth and the movement of the housing 27e to the left will be proportional to the wear developing in the brake shoes so that the slack in the brake rigging may be maintained at all times at a substantial ideal value which will permit the brake shoes, without regard to wear therein, to assume a preselected position away from the wheels whereby the piston in the brake cylinder will be able to make effective applications of the brakes without exceeding predetermined prescribed linear travel.

After the floating lever 54e has been moved manually toward the left by the handle 54b as far as the handle may be pulled, the handle is released so that the weight and tension of the brake rigging will pull the lever 54e back to the mouth end 83 of the lever slot 78, where the movement will be arrested by the pin 55e encountering the end walls 85a and 86a of the base members 79 and 80 which lie at opposite sides of the mouth 83. This position is shown in full lines in Figure 1.

When the brake shoes have been worn down to a point where it becomes necessary or desirable to discard the same and refit with new shoes, the housings 27e will ordinarily be in a position approaching the extreme left end of the stationary rack bar 22e. Such housings 27e must be moved all the way back to the origin position at the right end of the rack bar 22e and for this purpose the teeth 77 must be raised clear of the teeth 23e. This raised position of the housing is shown in Figure 4 and it is effected by first moving the floating lever 54e to the left to disengage the head 55b of the pin from its locked position and then lifting the lever 54e so as to elevate therewith the housing into the position indicated in Figure 4, whereupon the entire housing may be freely slid to the right over the rack bar 22e until the same reaches the origin point shown in full lines in Figuree 1, at which time the pin head 55b is restored to its upper position in which it has forced down the housing 27e and the teeth 77 into interlocking engagement with the rack bar teeth 23e.

Although I have disclosed herein the best form of the invention known to me at this time, I reserve the right to all such modifications and changes as may come within the scope of the following claims.

What is claimed is:

1. A slack adjuster for the foundation brakes of railway freight cars comprising a rack bar adapted to be affixed to a stationary part of the car, a pawl housing longitudinally and vertically movable on the rack bar with freedom to move in slack take-up direction but restrained against movement in slack restoring direction, said housing having a lost-motion slot therein extending in the direction of longitudinal movement of the housing on the rack bar, said housing having an inclined surface adjacent the slot having its high portion at the slack restoring end of the slot, and a headed pin slidable longitudinally and vertically in the slot and adapted to be slidably connected for movement to a movable part of the brake rigging and with the head riding upon the inclined surface, said inclined surface and pin head so positioned relatively to the rack bar that when the head occupies the high portion of the inclined surface such head engages the rack bar to restrain substantial upward vertical movement of the housing to an extent that would free the pawl from the rack bar and when the head is on the low portion of the inclined surface such head is free of the rack bar permitting vertical upward movement of the housing and the release of its pawl from the rack bar.

2. A slack adjuster for the foundation brakes of railway freight cars comprising a rack bar adapted to be affixed to a stationary part of the car, a pawl housing slidable on the rack bar and also having a substantially vertical movement with respect to the rack bar, said rack bar and housing having teeth engaged and disengaged by the vertical movements of the housing, said housing having a lost-motion slot extending substantially parallel with the length of the rack bar and having slack take-up and slack-restoring ends, said housing having an inclined surface adjacent the slot with its high portion adjacent the slack-restoring end of the slot and its low portion adjacent the take-up end of the slot, a coupling member for coupling a movable element of the brake rigging to said housing and slidable in the slot and adapted to abut the ends thereof to effect a slack take-up movement of the housing and a limit stop on the slack-restoring movement of the member, said coupling member also having a substantially vertical movement relatively in the housing and slot in the general direction of the vertical movement of the housing with respect to the rack bar, said coupling member having a part riding on said inclined surface to effect said vertical movements of the coupling member and positioned relatively to the rack bar that when on said high portion to engage the rack bar and cause interlocking engagement of said teeth and when on the low portion of the surface to disengage the rack bar to permit vertical movement of the housing to disengage the teeth.

3. In a slack adjuster, a rack bar, a housing having relative longitudinal and substantially vertical movements on the rack bar, said rack bar and housing having interlocking parts engaged and disconnected by said vertical movements, a coupling member for detachable connection to a movable element of the brake rigging and mounted in the housing for relative limited longitudinal and substantially vertical movements, said housing having an inclined surface with a high portion opposite said interlocking parts and a low portion displaced from the said interlocking parts, said coupling member having a part sliding on the inclined surface and vertically shiftable thereby incident to its longitudinal movement to move between said high and low portions of the inclined surface, the high and low portions of the inclined surface located relatively to the rack bar in order that the coupling member is disengaged from the rack bar when on the low portion to permit release of said interlocking parts and is engaged with the rack bar when on the high portion to lock the interlocking parts against release.

References Cited in the file of this patent

UNITED STATES PATENTS

| | | |
|---|---|---|
| 1,947,305 | Nash | Feb. 13, 1934 |
| 1,947,403 | Camp | Feb. 13, 1934 |